United States Patent
Shigenobu et al.

(10) Patent No.: US 11,882,269 B2
(45) Date of Patent: Jan. 23, 2024

(54) IMAGE ENCODING METHOD AND IMAGE ENCODING DEVICE

(71) Applicant: SOCIONEXT INC., Kanagawa (JP)

(72) Inventors: Yuya Shigenobu, Yokohama (JP); Masao Kitagawa, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 0 days.

(21) Appl. No.: 17/231,470

(22) Filed: Apr. 15, 2021

(65) Prior Publication Data
US 2021/0235070 A1    Jul. 29, 2021

Related U.S. Application Data

(63) Continuation of application No. PCT/JP2018/038986, filed on Oct. 19, 2018.

(51) Int. Cl.
H04N 19/103    (2014.01)

(52) U.S. Cl.
CPC .................. H04N 19/103 (2014.11)

(58) Field of Classification Search
CPC .... H04N 19/176; H04N 19/61; H04N 19/593; H04N 19/11; H04N 19/124; H04N 19/46; H04N 19/147; H04N 19/14; H04N 19/82
See application file for complete search history.

(56) References Cited

U.S. PATENT DOCUMENTS

| | | | |
|---|---|---|---|
| 2018/0113757 A1 | 4/2018 | Sakata et al. | |
| 2018/0288406 A1* | 10/2018 | Kouno | H04N 19/176 |

FOREIGN PATENT DOCUMENTS

| | | |
|---|---|---|
| JP | 2005-151017 A | 6/2005 |
| JP | 2007-267414 A | 10/2007 |
| JP | 2007-281634 A | 10/2007 |
| WO | 2016/200714 A2 | 12/2016 |
| WO | 2016/207933 A1 | 12/2016 |
| WO | 2018/108330 A1 | 6/2018 |

OTHER PUBLICATIONS

Tianyi Li et al., "A Deep Convolutional Neural Network Approach for Complexity Reduction On Intra-Mode HEVC," Proceedings of the EEE International Conference on Multimedia and Expo, Jul. 10-14, 2017; ICME 2017; pp. 1255-1260.

International Search Report and Written Opinion dated Dec. 18, 2018 in International Patent Application No. PCT/JP2018/038986; with English translation.

* cited by examiner

*Primary Examiner* — Farhan Mahmud
(74) *Attorney, Agent, or Firm* — Rimon P.C.

(57) ABSTRACT

An image encoding method includes, using an image as input, determining a first mode suited to encode the image in accordance with a first processing procedure; using the image as input, determining a second mode suited to encode the image in accordance with a second processing procedure; selecting one of first mode and the second mode as a final mode; encoding the image, using the final mode; and calculating a cost of using the second mode to encode the image. The second processing procedure is implemented by a reconfigurable circuit. In the selecting, the first mode is selected when the cost calculated in the calculating is higher than a first predetermined value, and the second mode is selected when the cost is lower than or equal to the first predetermined value.

17 Claims, 10 Drawing Sheets

FIG. 2B (a) Intra prediction mode directions (informative)

(b) Intra prediction angle direction (informative)

| predModeIntra | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| intraPredAngle | - | 32 | 26 | 21 | 17 | 13 | 9 | 5 | 2 | 0 | -2 | -5 | -9 | -13 | -17 | -21 | -26 |
| predModeIntra | 18 | 19 | 20 | 21 | 22 | 23 | 24 | 25 | 26 | 27 | 28 | 29 | 30 | 31 | 32 | 33 | 34 |
| intraPredAngle | -32 | -26 | -21 | -17 | -13 | -9 | -5 | -2 | 0 | 2 | 5 | 9 | 13 | 17 | 21 | 26 | 32 |

(c) Specification of intraPredAngle

IMAGE ENCODING METHOD AND IMAGE ENCODING DEVICE

CROSS REFERENCE TO RELATED APPLICATIONS

This is a continuation application of PCT Patent Application No. PCT/JP2018/038986 filed on Oct. 19, 2018, designating the United States of America. The entire disclosure of the above-identified application, including the specification, drawings and claims is incorporated herein by reference in its entirety.

FIELD

The present invention relates to an image encoding method and an image encoding device, and in particular to a method and device for selecting a mode suited to encoding and then encoding an image.

BACKGROUND

Encoding of moving images is roughly divided into preceding "implementer-dependent" processing and succeeding "standardized" processing. The former corresponds to determining various modes such as determination of the size of encoded blocks, intra prediction, and motion detection. On the other hand, the latter corresponds to standardized processing performed in accordance with the mode determined in the former processing, such as orthogonal transformation, quantization, entropy coding, and motion compensation.

The former mode determination is processing performed in accordance with a theoretical algorithm and corresponds to obtaining an optimum or quasi optimum combination from among an enormous number of combinations. Thus, it becomes possible to design a mode determination engine that performs such mode determination. Note that the engine is a device that executes data processing and is, for example, hardware such as an electronic circuit, or an integrated system of software and hardware, the integrated system including programs and a CPU executing programs.

Meanwhile, in recent years, it has become possible to give combinations of an enormous amount of input and expected outputs without using any algorithm while handling the content of processing as a black box and to design desired hardware and software by machine learning (see NPL 1). Thus, there is a possibility that more efficient mode determination engines than those achieved by conventional technology (i.e., processing performed in accordance with theoretical algorithms) may be obtained by using machine learning.

CITATION LIST

Non Patent Literature

NPL 1: Tianyi Li, et.al, "A DEEP CONVOLUTIONAL NEURAL NETWORK APPROACH FOR COMPLEXITY REDUCTION ON INTRA-MODE HEVC," published on 10-14 Jul. 2017 in 2017 IEEE International Conference

SUMMARY

Technical Problem

However, the design of mode determination engines by machine learning is not perfect. Machine-learned mode determination engines have the risk of producing unintended inappropriate results (see NPL 1). When a machine-learned mode determination engine has produced an inappropriate result, it can be thought that the efficiency of succeeding encoding may decline, and if there is a restrict on the transmission quantity of encoded data, problems such as an extreme deterioration in image quality may arise as a result.

In view of this, the present invention has been made in light of the problems described above, and it is an object of the present invention to provide an image encoding method and an image encoding device that include an architecture capable of enjoying the merit of machine-learned mode determination engines while minimizing the risk of machine-learned mode determination engines.

Solution to Problem

To achieve the object described above, an image encoding method according to one aspect of the present invention is an image encoding method for encoding an image, and includes using the image as input, determining a first mode suited to encode the image in accordance with a first processing procedure, using the image as input, determining a second mode suited to encode the image in accordance with a second processing procedure, selecting one of the first mode and the second mode as a final mode, encoding the image, using the final mode, and calculating a cost of using the second mode to encode the image. The second processing procedure is implemented by a circuit that is reconfigurable, and in the selecting, the first mode is selected when the cost is higher than a first predetermined value, and the second mode is selected when the cost is lower than or equal to the first predetermined value.

To achieve the object described above, an image encoding device according to one aspect of the present invention is an image encoding device for encoding an image, and includes a first mode determination engine that, using the image as input, determines a first mode suited to encode the image in accordance with a first processing procedure, a second mode determination engine that, using the image as input, determines a second mode suited to encode the image in accordance with a second processing procedure, a mode selector that selects one of the first mode and the second mode as a final mode, an encoder that encodes the image, using the final mode, and a cost calculator that calculates a cost of using the second mode to encode the image. The second processing procedure is implemented by a circuit that is reconfigurable, and the mode selector selects the first mode when the cost is higher than a first predetermined value and selects the second mode when the cost is lower than or equal to the first predetermined value.

Advantageous Effects

According to the present invention, it is possible to provide an image encoding method and an image encoding device that include an architecture capable of enjoying the merit of machine-learned mode determination engines while minimizing the risk of machine-learned mode determination engines.

BRIEF DESCRIPTION OF DRAWINGS

These and other advantages and features will become apparent from the following description thereof taken in conjunction with the accompanying drawings, by way of non-limiting examples of embodiments disclosed herein.

DESCRIPTION OF EMBODIMENTS

Hereinafter, embodiments will be described in detail with reference to the drawings. Note that each embodiment described below illustrates a generic or specific example of the present invention. Numerical values, shapes, materials, constituent elements, positions of constituent elements in arrangement, connection forms of constituent elements, steps, a sequence of steps, and so on in the following embodiments are mere examples and do not intend to limit the scope of the present invention. Among the constituent elements described in the following embodiments, those that are not recited in any independent claim, which defines the broadest concept of the present invention, are described as optional constituent elements. Each drawing does not necessarily provide precise depiction. Substantially the same constituent elements throughout the drawings are given the same reference signs, and detailed descriptions thereof may be omitted or simplified.

Embodiment 1

First, an image encoding device and an image encoding method according to Embodiment 1 will be described.

Figure 1:
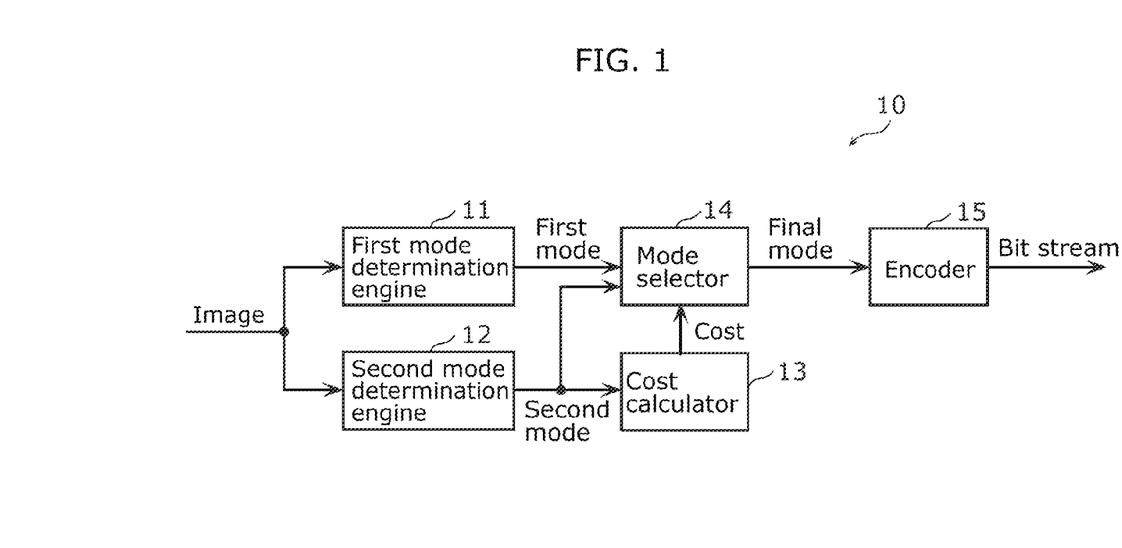
FIG. 1 is a block diagram illustrating a configuration of an image encoding device according to Embodiment 1.

FIG. 1 is a block diagram illustrating a configuration of image encoding device 10 according to Embodiment 1. Image encoding device 10 is a device that encodes images such as moving images or still images, and includes first mode determination engine 11, second mode determination engine 12, cost calculator 13, mode selector 14, and encoder 15.

First mode determination engine 11 is a processor that, using an image to be encoded as input (the image is hereinafter also referred to as a "target image"), determines a first mode suited to encode the target image in accordance with a first processing procedure, and is implemented as, for example, an electronic circuit or a circuit system that includes programs and a CPU executing problems. The first processing procedure is, for example, a processing procedure for calculating the cost of using each of a plurality of predetermined modes to encode the target image, and determining a mode having a minimum calculated cost as the first mode.

That is, first mode determination engine 11 is typically a mode determination engine according to a conventional technique (i.e., processing performed in accordance with a theoretical algorithm), and specifically, performs preceding "implementer-dependent" processing such as determination of the size of encoded blocks, intra prediction, and motion detection when encoding a moving image.

Second mode determination engine 12 is a processor that, using an image to be ended as input (i.e., the same target image as the image to be processed by first mode deamination engine 11), determines a second mode suited to encode the target image in accordance with a second processing procedure, and is implemented as a reconfigurable circuit. The second processing procedure is, for example, a processing procedure for determining the second mode from among a plurality of predetermined modes without using cost calculation. The reconfigurable circuit as used herein refers to a circuit device in which logic circuits and their connections are rewritable by programming, and is, for example, a field-programmable gate array (FPGA) or a circuit system that includes a rewritable memory storing programs and a CPU executing programs. In the present embodiment, second mode determination engine 12 is configured as a circuit that is reconfigured by machine learning, such as a neural network.

That is, second mode determination engine 12 is typically a machine-learned mode determination engine that is a processor that determines the second mode suited to encode the target image in accordance with a brain obtained by machine learning (i.e., second processing procedure) without using cost calculation, and performs, as specific processing, the same processing as in first mode determination engine 11, i.e., performs preceding "implementer-dependent" processing such as determination of the size of encoded blocks, intra prediction, and motion detection when encoding a moving image.

Cost calculator 13 is a processor that calculates the cost of using the second mode determined by second mode determination engine 12 to encode the target image (this cost is hereinafter also referred to as the "cost for the second mode"), and is implemented as, for example, an electronic circuit or a circuit system that includes programs and a CPU executing programs.

Mode selector 14 is a processor that selects one of the first mode determined by first mode determination engine 11 and the second mode determined by second mode determination engine 12 as a final mode, and is more specifically a processor that selects the first mode when the cost for the second mode calculated by cost calculator 13 is higher than a first predetermined value and selects the second mode when the cost for the second mode is lower than or equal to the first predetermined value. Mode selector 14 is implemented as, for example, an electronic circuit or a circuit system that includes programs and a CPU executing programs. For example, the first predetermined value may be set to a minimum cost incurred in the process in which first mode determination engine 11 determines the first mode, or to a value that is predicted to correspond to such a minimum cost.

Encoder 15 is a processor that encodes the target image, using the final mode selected by mode selector 14, and outputs a resultant image as a bit stream, and is implemented as, for example, an electronic circuit or a circuit system that includes programs and a CPU executing programs. Specifically, encoder 15 performs succeeding "standardized" processing when encoding a moving image, i.e., performs orthogonal transformation and quantization and then performs entropy coding on the target image, using the final mode, so as to output a resultant image as a bit stream. Encoder 15 further performs inverse quantization and inverse orthogonal transformation on the image that has undergone orthogonal transformation and quantization, and then stores a reference image in an internal frame memory, the reference image being obtained by loop filter processing such as deblocking. The reference image stored in the frame memory may be used to subtract a predicted image obtained by motion compensation processing using the final mode from the target image before orthogonal transformation and quantization, or may be used to add the predicted image to the target image that has undergone inverse quantization and inverse orthogonal transformation, before loop filter processing.

Next is a description of specific examples of the modes determined by first mode determination engine 11 and second mode determination engine 12.

Figure 2A:
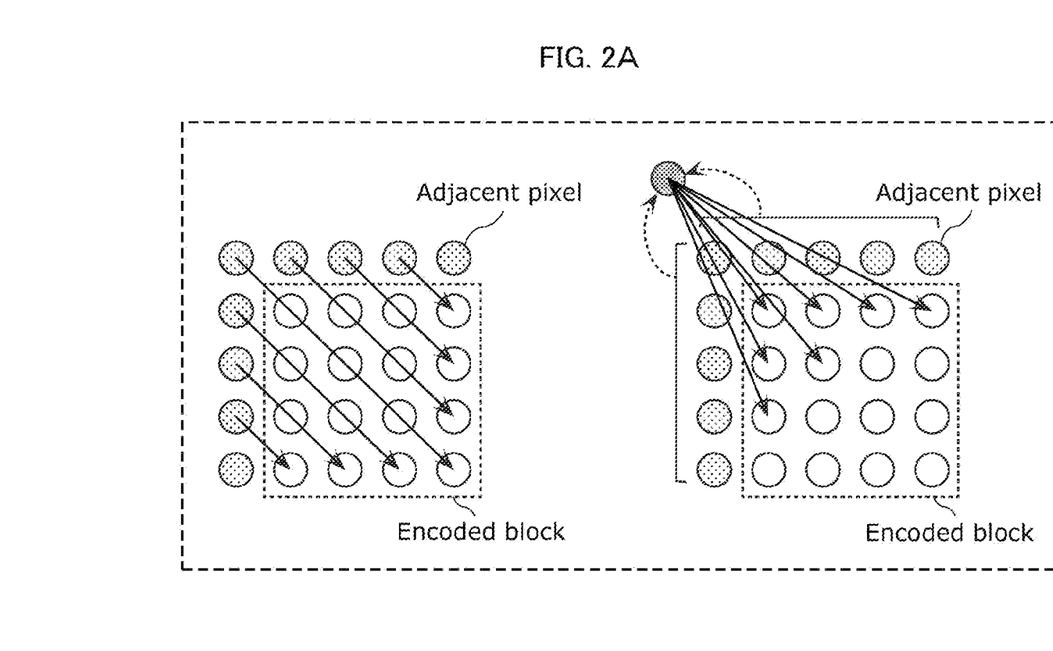
FIG. 2A is an explanatory diagram showing one example of modes of encoding a moving image (intra prediction modes).

FIG. 2A is an explanatory diagram showing one example of modes of encoding a moving image (here, intra prediction modes). As illustrated in the drawing, there are various intra prediction modes, including a directional intra prediction mode such as generating a predicted image on the basis of adjacent pixels located in a direction such as 45 degrees or 90 degrees from a target pixel, and a non-directional intra prediction mode such as generating a predicted image from an average value of adjacent pixels.

Figure 2B:
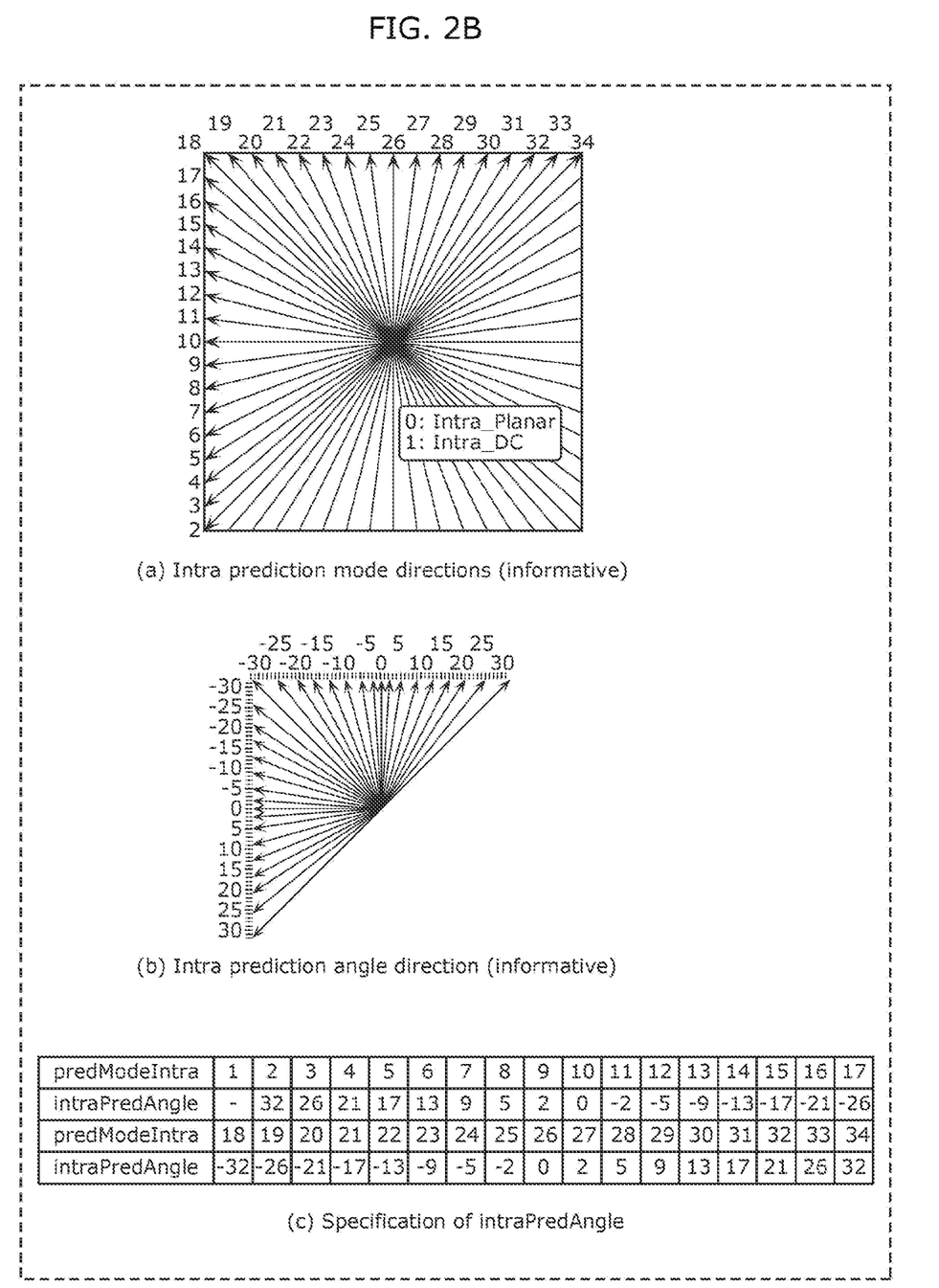
FIG. 2B is a diagram illustrating the types of intra prediction modes according to H.265 standards.

FIG. 2B is a diagram illustrating the types of intra prediction modes according to H.265 standards. For example, prediction directions for intra prediction mode numbers 0 to 34 according to H.265 standards are illustrated in (a) of FIG. 2B, and the definition of the angle with respect to the prediction direction in each intra prediction mode according to H.265 standards is illustrated in (b) of FIG. 2B. The correspondence between the definition of the angle and each intra prediction mode number according to H.265 standards is illustrated in (c) of FIG. 2B. As illustrated in FIG. 2B, there are 33 directional intra prediction modes (mode numbers 2 to 34) and two non-directional intra prediction modes (mode numbers 0 (Planar) and 1 (DC)) according to H.265 standards.

In the present embodiment, first mode determination engine 11 and second mode determination engine 12 each select an intra prediction mode suited to encoding from among a plurality of intra prediction modes illustrated in FIG. 2B in accordance with the first processing procedure or the second processing procedure and determine the selected mode as the first mode or the second mode when encoding a moving image according to H.265 standards.

When determining an intra prediction mode according to H.265 standards, first mode determination engine 11 uses, for example, a common cost function (i.e., Cost=Distortion+λ*Rate) for R-D optimization (rate-distortion optimization). Distortion as used herein refers to encoding distortion and uses, for example, a sum of absolute values (SAD) of difference values between the original image and the predicted image in encoded blocks. Rate uses, for example, the number of bits generated during encoding. λ is called a Lagrange's multiplier, which is a parameter for optimizing the encoding distortion and the number of bits. For each of 33 directional intra prediction modes, first mode determination engine 11 calculates the cost for encoded blocks when prediction processing is performed using adjacent pixels according to H.265 standards, and determines an intra prediction mode having a lowest cost as the first mode.

Cost calculator 13 also uses the aforementioned cost function (Cost=Distortion+λ*Rate) for R-D optimization when calculating the cost for the second mode determined by second mode determination engine 12.

Figure 3A:
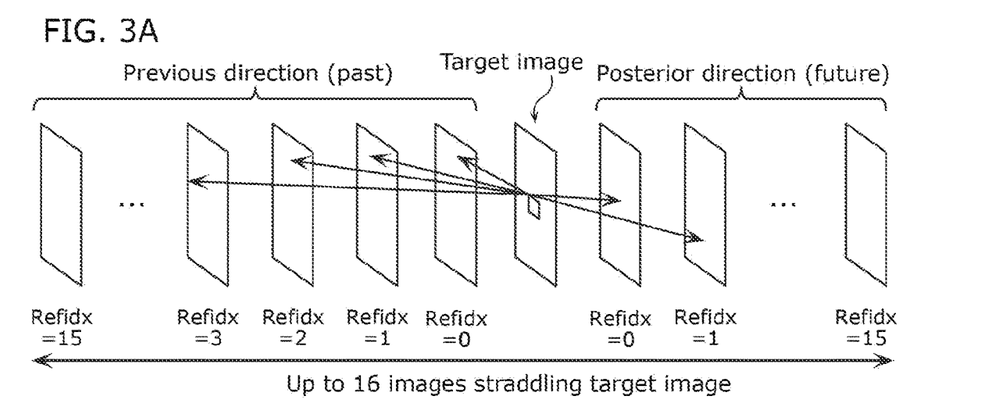
FIG. 3A is an explanatory diagram showing another example of the modes of encoding a moving image (reference images for use in motion detection).

FIG. 3A is an explanatory diagram showing another example of the mode of encoding a moving image (here, reference images for use in motion detection). As illustrated in the drawing, inter prediction used in H.265 standards enables predicting motion (i.e., motion vector) from both of a previous direction (past) and a posterior direction (future) in terms of time and defines 16 planes of reference images straddling the target image. In either of the previous and posterior directions, the reference images do not necessarily have to be continuous images, and arbitrarily images may be selected as reference images. Note that the motion vector corresponds to coordinates that indicate from which of the pixels the prediction starts in the image indicated by the reference image number.

Figure 3B:
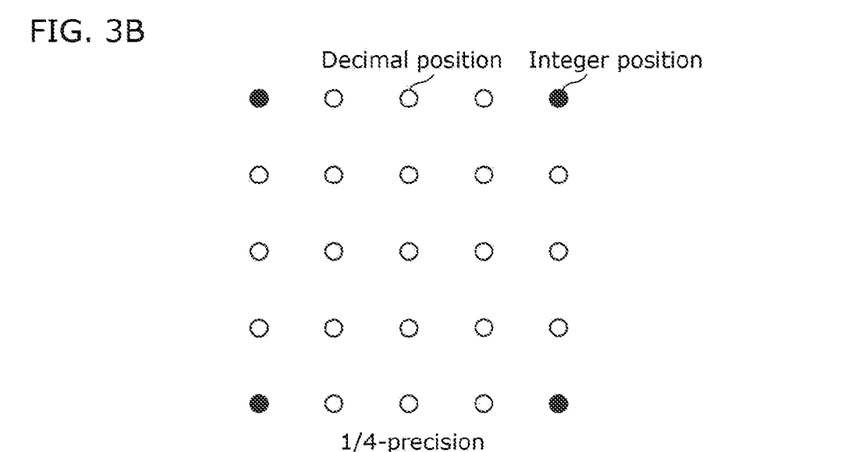
FIG. 3B is an explanatory diagram showing one example of motion vector precision (¼ precision) in motion detection during encoding of a moving image.

FIG. 3B is an explanatory diagram showing one example of motion vector precision (here, ¼ precision) in motion detection during encoding of a moving image. As illustrated in FIG. 3B, the motion vector can point at a decimal position. In that case, filtering is performed based on pixels around the position indicated by the motion vector so as to generate pixels. This decimal precision corresponds to ¼ precision in H.265 standards.

In the present embodiment, when encoding a moving image according to H.265 standards, first mode determination engine 11 and second mode determination engine 12 each select a reference image suited to encoding from among the reference images illustrated in FIG. 3A in accordance with the first or second processing procedure and determines a motion vector with ¼ precision illustrated in FIG. 3B so as to select a mode of motion detection (i.e., a combination of the reference image and the motion vector) and determine the selected mode as the first or second mode.

When determining an intra prediction mode according to H.265 standards, first mode determination engine 11 uses, for example, a cost function (Cost=Distortion+λ*Rate) for R-D optimization. If only the immediately previous three images can be referenced in the previous direction, first mode determination engine 11 calculates, for each of the three reference images, the cost of performing prediction processing using the reference image and the motion vector and determines the mode of motion detection (reference image+motion vector) having a lowest cost as the first mode.

Figure 4:
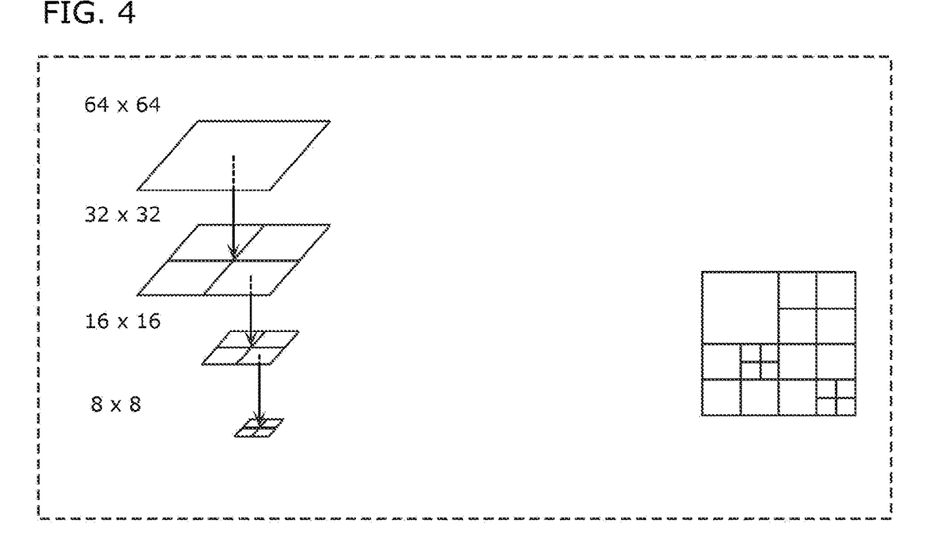
FIG. 4 is an explanatory diagram showing another example of the modes of encoding a moving image (sizes of encoded blocks).

FIG. 4 is an explanatory diagram showing another example of the mode of encoding a moving image (here, sizes of encoded blocks). The sizes of encoded blocks according to H.265 standards are illustrated herein. As illustrated in the drawing, encoded blocks used in H.265 standards are only square blocks and can be reduced in size. A minimum encoded block size is 8×8. In the section between intra prediction and inter prediction, a minimum size is 8×8, and the intra prediction mode or the inter prediction mode can be individually specified by further dividing the size into 4×4 blocks.

In the present embodiment, when encoding a moving image according to H.265 standards, first mode determination engine 11 and second mode determination engine 12 each select an encoded block size (i.e., mode) suited to encoding from among a plurality of encoded block sizes (i.e., modes) illustrated in FIG. 4 in accordance with the first or second processing procedure and determines the selected mode as the first or second mode.

When determining a mode of encoded block size according to H.265 standards, first mode determination engine 11 uses, for example, a cost function (Cost=Distortion+ A*Rate) for R-D optimization for each intra prediction mode. Specifically, for each of the intra prediction modes (35 modes), first mode determination engine 11 calculates the cost of the encoded block when performing prediction processing using adjacent pixels in accordance with the content of processing in H.265 standards and selects an intra prediction mode having a lowest cost as the cost of the encoded block size. This processing is performed for all encoded block sizes from 64×64 to 8×8.

Then, the cost of each encoded block size is compared to determine one encoded block size (i.e., first mode). That is, first mode determination engine 11 compares the cost of selecting four 8×8 encoded block sizes and the cost of selecting a 16×16 encoded block size, then compares the cost of selecting a lower cost and the cost of selecting a 32×32 encoded block size, then compares the cost of selecting a lower cost and the cost of selecting a 64×64 encoded block size, and determines an optimum encoded block size by selecting an encoded block size having a lower cost. The determined encoded block size is the first mode of encoded block size.

Next is a description of operations (i.e., image encoding method) of image encoding device 10 configured as described above according to Embodiment 1.

Figure 5:
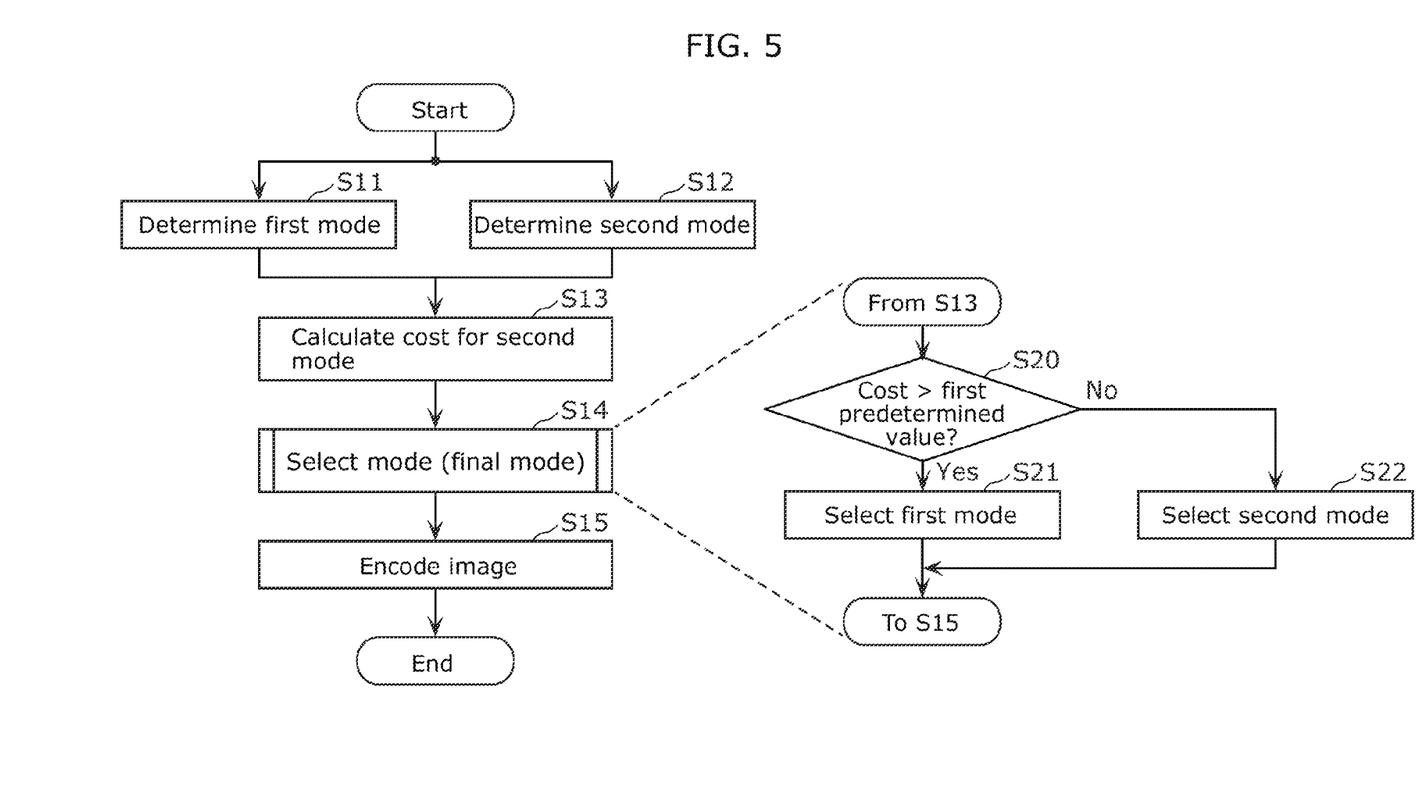
FIG. 5 is a flowchart illustrating operations of the image encoding device according to Embodiment 1.

FIG. 5 is a flowchart illustrating operations of image encoding device 10 according to Embodiment 1.

First, first mode determination engine 11 determines a first mode suited to image encoding for the target image in accordance with a first processing procedure (first mode determination step S11). Specifically, first mode determination engine 11 calculates the cost of using each of a plurality of predetermined modes to encode an image through processing for encoding a moving image, such as determination of the size of encoded blocks, intra prediction, and motion detection, and determines a mode having a lowest calculated cost as the first mode.

On the other hand, second mode determination engine 12 determines a second mode suited to encode the target image in accordance with a second processing procedure (second mode determination step S12), the target image being the same as the image processed by first mode determination engine 11. Specifically, second mode determination engine 12 determines a second mode suited to encode the target image in accordance with a brain obtained by machine learning (i.e., second processing procedure) without using cost calculation in the processing for encoding a moving image, such as the determination of the size of encoded blocks, intra prediction, and motion detection.

Note that the order in which the determination of the first mode by first mode determination engine 11 (first mode determination step S11) and the determination of the second mode by second mode determination engine 12 (second mode determination step S12) are performed is arbitrary, and these determinations may be performed in parallel at the same time.

Next, cost calculator 13 calculates the cost of using the second mode determined by second mode determination engine 12 to encode the target image (cost calculation step S13).

Then, mode selector 14 selects one of the first mode determined by first mode determination engine 11 and the second mode determined by second mode determination engine 12 as a final mode on the basis of the cost calculated by cost calculator 13 (mode selection step S14).

Specifically, as in the sub-flowchart illustrated on the right side in the drawing, mode selector 14 determines whether the cost for the second mode calculated by cost calculator 13 is higher than a first predetermined value (S20), and if the cost for the second mode is determined to be higher than the first predetermined value (Yes in S20), selects the first mode as the final mode (S21), or if the cost for the second mode is determined to be lower than or equal to the first predetermined value (No in S20), selects the second mode as the final mode (S22).

Finally, encoder 15 encodes the target image, using the final mode selected by mode selector 14, and outputs a resultant image as a bit stream (encoding step S15). Specifically, encoder 15 performs orthogonal transformation and quantization and then performs entropy coding on the target image, using the final mode, and outputs a resultant image as a bit stream. At this time, encoder 15 stores a reference image in an internal frame memory, the reference image being obtained by performing inverse quantization and inverse orthogonal transformation and then performing loop-filter processing such as deblocking on the image that has undergone orthogonal transformation and quantization, and uses the reference image stored in the frame memory to subtract a predicted image from the target image before orthogonal transformation and quantization or to add the predicted image to the image that has undergone inverse quantization and inverse orthogonal transformation before the loop filter processing, the predicted image being obtained by performing motion compensation processing using the final mode.

As described above, image encoding device 10 according to the present embodiment is a device for encoding an image, and includes first mode determination engine 11 that, using the image as input, determines the first mode suited to encode the image in accordance with the first processing procedure, second mode determination engine 12 that, using the image as input, determines the second mode suited to encode the image in accordance with the second processing procedure, mode selector 14 that selects one of the first mode and the second mode as the final mode, encoder that encodes the image, using the final mode, and cost calculator 13 that calculates the cost of using the second mode to encode the image. The second processing procedure is implemented by a reconfigurable circuit. Mode selector 14 selects the first mode when the cost calculated by cost calculator 13 is higher than the first predetermined value, and selects the second mode when the cost calculated by cost calculator 13 is lower than or equal to the first predetermined value.

The image encoding method according to the present embodiment is an image encoding method for encoding an image, and includes first mode determination step S11 of, using the image as input, determining the first mode suited to encode the image in accordance with the first processing procedure, second mode determination step S12 of, using the image as input, determining the second mode suited to encode the image in accordance with the second processing procedure, mode selection step S14 of selecting one of the first mode and the second mode as the final mode, encoding step S15 of encoding the image, using the final mode, and cost calculation step S13 of calculating the cost of using the second mode to encode the image. The second processing procedure is implemented by a reconfigurable circuit. Mode selection step S14 involves selecting the first mode when the cost calculated in cost calculation step S13 is higher than the first predetermined value, and selecting the second mode when the cost calculated in cost calculation step (S13) is lower than or equal to the first predetermined value.

Accordingly, the first mode and the second mode, both suited to encode the target image, are determined in accordance with the two types of processing procedures. Then, the cost of using the second mode in encoding is calculated, and if the calculated cost is higher than the first predetermined value, the first mode is selected, and otherwise, the second mode is selected. The second mode uses a processing procedure implemented by a reconfigurable circuit.

Thus, for example, first mode determination engine 11 that determines the first mode is provided as a mode determination engine according to a conventional technique (i.e., processing performed in accordance with a theoretical algorithm), and second mode determination engine 12 that determines the second mode is provided as a mode determination engine implemented as a circuit that is reconfigured by machine learning, such as a neural network. In this case, if the second mode determined by machine-learned second mode determination engine 12 is appropriate in terms of cost, the second mode is adopted as the final mode, and if the second mode is inappropriate in terms of cost, as a failsafe operation, the first mode is adopted as the final mode, and in this state, the target image is encoded.

Accordingly, it is possible to achieve image encoding device and its method that include an architecture capable of enjoying the merit of machine-learned mode determination engines, while minimizing the risk of machine-learned mode determination engines, using the fail-safe function.

The first processing procedure is a processing procedure for calculating the cost of using each of a plurality of predetermined modes to encode the image and determining a mode having a lowest calculated cost as the first mode. The second processing procedure is a processing procedure for determining the second mode from among a plurality of predetermined modes without using cost calculation.

Thus, the first mode is determined from the viewpoint of the cost of encoding, whereas the second mode is determined from the viewpoint of factors other than the cost of encoding. Accordingly, first mode determination engine 11 that determines the first mode can be implemented as a mode determination engine according to a conventional technique (i.e., processing performed in accordance with a theoretical algorithm), and second mode determination engine 12 that determines the second mode can be implemented as a mode determination engine configured by a circuit that is reconfigured by machine learning, such as a neural network.

The reconfigurable circuit implementing second mode determination engine 12 is reconfigured by machine learning. Accordingly, the second mode is determined by the circuit that is reconfigurable by machine learning, and therefore a more appropriate mode can be determined as the second mode by repeatedly subjecting second mode determination engine 12, which determines the second mode, to machine learning.

In Embodiment 1, the determination of the first mode (first mode determination step S11) is always executed before the calculation of the cost for the second mode (cost calculation step S13) and the comparison between the result of cost calculation and the first predetermined value (mode selection step S14), but the present embodiment is not limited to this procedure, and whether or not to execute the determination of the first mode may be determined depending on the result of comparison between the cost for the second mode and the first predetermined value.

Figure 6:
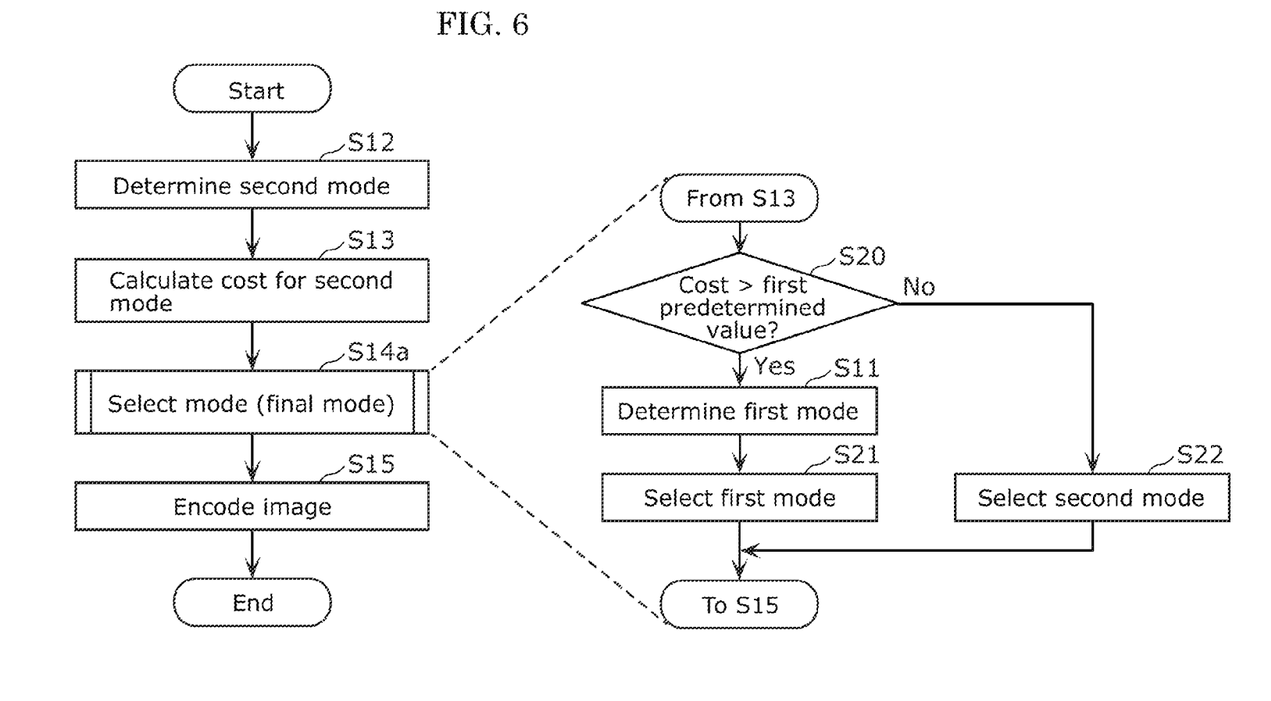
FIG. 6 is a flowchart illustrating operations of the image encoding device according to Variation 1 of Embodiment 1.

FIG. 6 is a flowchart illustrating operations (i.e., image encoding method) of the image encoding device according to Variation 1 of Embodiment 1, in which whether or not to execute the determination of the first mode (first mode determination step S11) is controlled depending on the result of comparison between the cost for the second mode and the first predetermined value. The same processing steps as those in FIG. 5 according to Embodiment 1 are given the same reference signs.

According to this variation, the determination of the first mode (first mode determination step S11) is executed after the cost for the second mode is determined to be higher than the first predetermined value (Yes in S20) in mode selection processing (S14a). That is, when mode selector 14 has determined that the cost for the second mode calculated by cost calculator 13 is higher than the first predetermined value (Yes in S20), first mode determination engine 11 determines the first mode suited to image encoding for the target image in accordance with the first processing procedure (first mode determination step S11). The other procedure is the same as the procedure in FIG. 5 according to Embodiment 1.

As described above, according to this variation, first mode determination step S11 is executed only when the cost for the second mode is higher than the first predetermined value (Yes in S20), out of the cases in which the cost for the second mode is higher than the first predetermined value (Yes in S20) and in which the cost for the second mode is lower than or equal to the first predetermined value (No in step S20).

Accordingly, the first mode is determined only when the first mode is determined to be used as the final mode. This reduces processing loads and reduces power consumption of first mode determination engine 11 that determines the first mode, as compared with the case where the first mode is always determined.

In Embodiment 1, the selection of the final mode (i.e., selection between the first mode and the second mode) is made based on only the cost for the second mode (mode selection step S14), but this selection may be made in consideration of not only the cost but also the probability of suitability of the second mode to image encoding.

Figure 7:
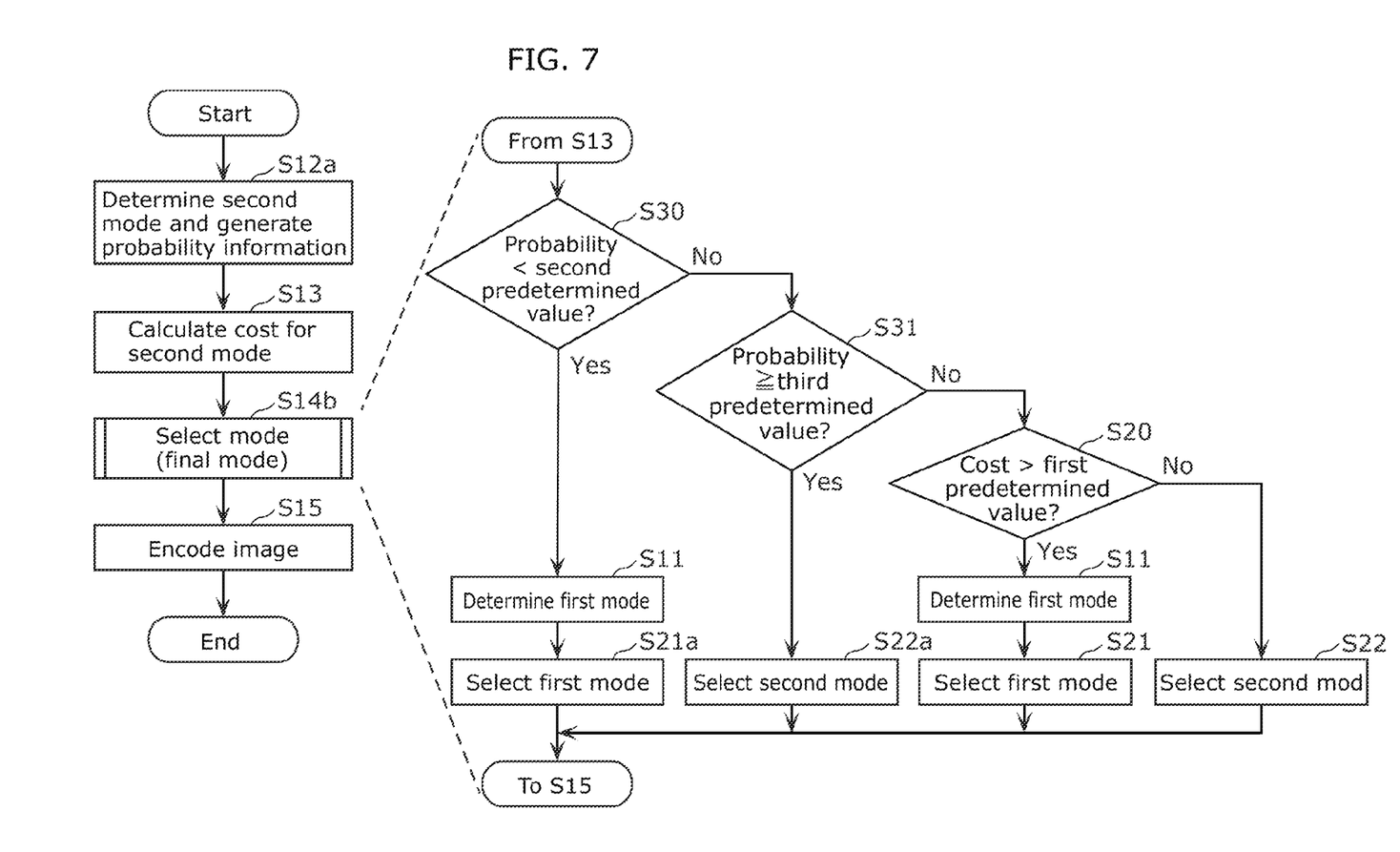
FIG. 7 is a flowchart illustrating operations of the image encoding device according to Variation 2 of Embodiment 1.

FIG. 7 is a flowchart illustrating operations (i.e., image encoding method) of the image encoding device according to Variation 2 of Embodiment 1, in which the final mode is selected in consideration of not only the cost for the second mode but also the probability of suitability of the second mode to image encoding. Note that this flowchart also includes the feature according to Variation 1 of Embodiment 1 (whether or not to execute the determination of the first mode is determined depending on the result of determination by mode selector 14). The same processing steps as those in FIG. 5 according to Embodiment 1 are given the same reference signs.

According to this variation, when determining the second mode, second mode determination engine 12 also generates probability information that indicates the probability of suitability of the second mode to encode the target image, in addition to determining the second mode suited to encode the target image in accordance with the second processing procedure for the same target image as the image to be processed (second mode determination step S12a). For example, the reliability (probability) of the second mode obtained from the output layer of a neural network constituting second mode determination engine 12 may be used as the probability information. That is, as second mode determination engine 12, the output layer of the neural network is composed of a plurality of output nodes that correspond respectively to a plurality of modes that may become candidates for the second mode. Then, using the target image as input, second mode determination engine 12 determines, as the second mode, a mode that corresponds to the output node having a maximum value among the values of the output nodes, and generates the ratio of the value obtained at the output node to a total of the values obtained at all of the output nodes as the probability information.

In mode selection processing (S14b), mode selector 14 first determines whether the probability indicated by the probability information generated by second mode determination engine 12 is lower than a second predetermined value (S30) before the comparison between the cost for the second mode calculated by cost calculator 13 and the first predetermined value (S20). As a result, if the probability indicated by the probability information is lower than the second predetermined value (Yes in S30), first mode determination engine 11 determines the first mode (first mode determination step S11), and then mode selector 14 selects the first mode determined by first mode determination engine 11 as the final mode (S21a).

On the other hand, if the probability indicated by the probability information is not lower than the second predetermined value (No in S30), mode selector 14 subsequently determines whether the probability indicated by the probability information is higher than or equal to a third predetermined value (S31), and if the probability indicated by the probability information is higher than or equal to the third predetermined value (Yes in S31), selects the second mode as the final mode (S22a). The third predetermined value as used herein is a value greater than the second predetermined value (i.e., value indicating higher probability).

On the other hand, if the probability indicated by the probability information is not higher than or equal to the third predetermined value (No in S31), the same processing as in the mode selection according to Variation 1 described above is performed (S14a: S20, S11, S21, S22). That is, mode selector 14 determines whether the cost for the second mode calculated by cost calculator 13 is higher than the first predetermined value (S20). As a result, if the cost for the second mode is determined to be higher than the first predetermined value (Yes in S20), first mode determination engine 11 determines the first mode (first mode determination step S11), and accordingly mode selector 14 selects the first mode determined by first mode determination engine 11 as the final mode (S21). On the other hand, if the cost for the second mode is determined to be lower than or equal to the first predetermined value (No in S20), mode selector 14 selects the second mode as the final mode (S22).

In this way, in second mode determination step S12a according to this variation, the probability information indicating the probability of suitability of the second mode to image encoding is generated in addition to the determination of the second mode. In mode selection step S14, the first mode is selected (S21a) when the probability indicated by the probability information is lower than the second predetermined value (Yes in S30), and the second mode is selected (S22a) when the probability indicated by the probability information is higher than or equal to the third predetermined value (Yes in S31), Accordingly, the selection between the first mode and the second mode is made in consideration of not only the cost for the second mode but also the probability of suitability of the second mode to image encoding. This improves the reliability of mode selection.

First mode determination step S11 is executed only when the probability indicated by the probability information is lower than the second predetermined value (Yes in S30), out of the cases in which the probability indicated by the probability information is lower than the second predetermined value (Yes in S30) and in which the probability indicated by the probability information is higher than or equal to the third predetermined value (Yes in S31).

Thus, the first mode is determined only when the first mode is determined to be used as the final mode as a result of determination using the probability information. This reduces processing loads and reduces power consumption of first mode determination engine 11 that determines the first mode, as compared with the case where the first mode is always determined.

Embodiment 2

Next is a description of an image encoding device and an image encoding method according to Embodiment 2.

Figure 8:
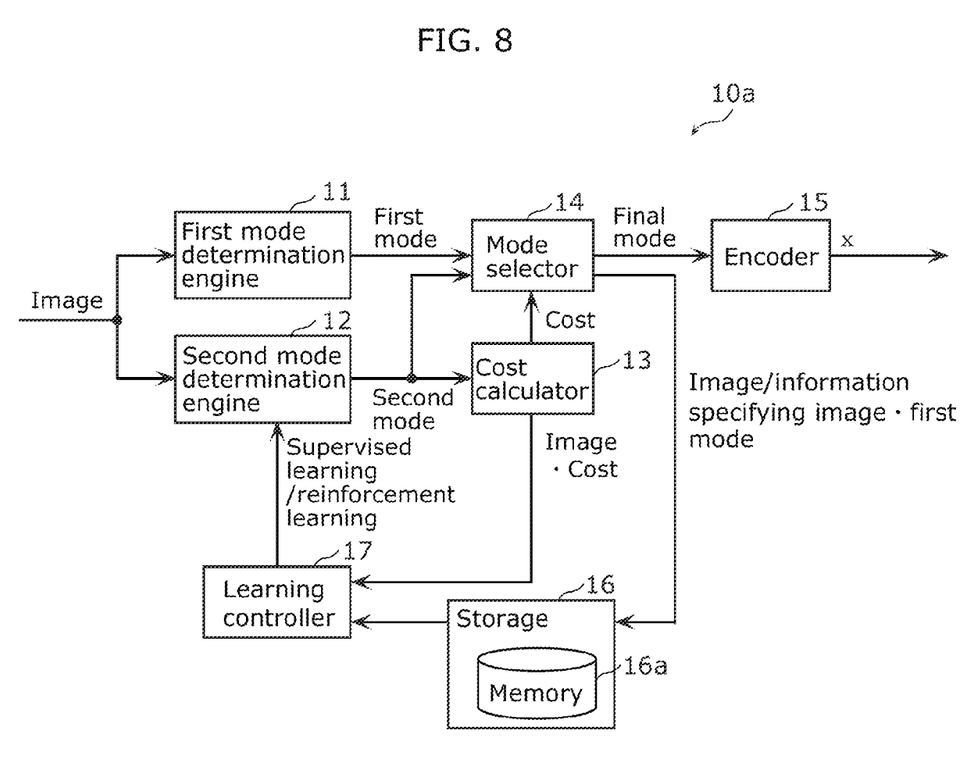
FIG. 8 is a block diagram illustrating a configuration of an image encoding device according to Embodiment 2.

FIG. 8 is a block diagram illustrating a configuration of image encoding device 10a according to Embodiment 2. As in Embodiment 1, image encoding device 10a is a device for encoding an image such as a moving image or a still image, but differs from the device according to Embodiment 1 in its additional function of subjecting second mode determination engine 12 to learning. To provide for this, image encoding device 10a includes storage 16 and learning controller 17, in addition to the configuration of image encoding device 10 according to Embodiment 1 (first mode determination engine 11, second mode determination engine 12, cost calculator 13, mode selector 14, and encoder 15). The following description mainly focuses on differences from Embodiment 1.

Storage 16 is a processor that includes memory 16a implemented as, for example, a non-volatile memory and stores the first mode determined by first mode determination engine 11 and either the target image or information specifying the target image in memory 16a when the second mode is not selected by mode selector 14 (i.e., the first mode is selected). Note that the information specifying the target image is information for identifying the target image and to be referenced by learning controller 17 to acquire the target image.

Learning controller 17 is a processor that subjects second mode determination engine 12 to machine learning, and more specifically is a processor that subjects a reconfigurable circuit that implements second mode determination engine 12 to machine learning, using the information stored in memory 16a or the cost calculated by cost calculator 13, so as to reconfigure the reconfigurable circuit.

Specifically, learning controller 17 subjects second mode determination engine 12 to supervised learning or reinforcement learning, depending on advance settings of learning controller 17. In the supervised learning, learning controller 17 reads out the first mode determined by first mode determination engine 11 and either the target image or information specifying the target image from memory 16a. Then, learning controller 17 subjects the reconfigurable circuit implementing second mode determination engine 12 to supervised learning, using, as input data, either the target image read out from memory 16a or the target image indicated by the information specifying the target image and read out from memory 16a and also using the first mode read out from memory 16a as training data. In the reinforcement learning, on the other hand, learning controller 17 acquires the cost calculated for the second mode determined by second mode determination engine 12 and the target image at that time from cost calculator 13. Then, learning controller 17 subjects the reconfigurable circuit that implements second mode determination engine 12 serving as an agent to reinforcement learning, using the acquired target image as input data and using a value corresponding to the acquired cost (e.g., a reciprocal of the cost) as a reward.

Note that storage 16 and learning controller 17 are each implemented as an electronic circuit or a circuit system that includes programs or a CPU executing programs.

Next is a description of operations (i.e., image encoding method) of image encoding device 10a according to Embodiment 2.

Image encoding device 10a according to the present embodiment has an encoding mode and a learning mode as its operation modes. In the encoding mode, among all of the constituent elements of image encoding device 10a, all constituent elements excluding learning controller 17 operate so as to enable encoding of an input image and storage into memory 16a. In the learning mode, on the other hand, among all of the constituent elements of image encoding device 10a, at least second mode determination engine 12 and learning controller 17 operate so as to subject second mode determination engine 12 to machine learning. Note that the learning mode may be performed in parallel with the encoding mode. These operation modes are controlled by, for example, a controller (not shown) that controls all of the constituent elements of image encoding device 10a and that is implemented as a circuit system that includes programs and a CPU executing programs.

Figure 9A:
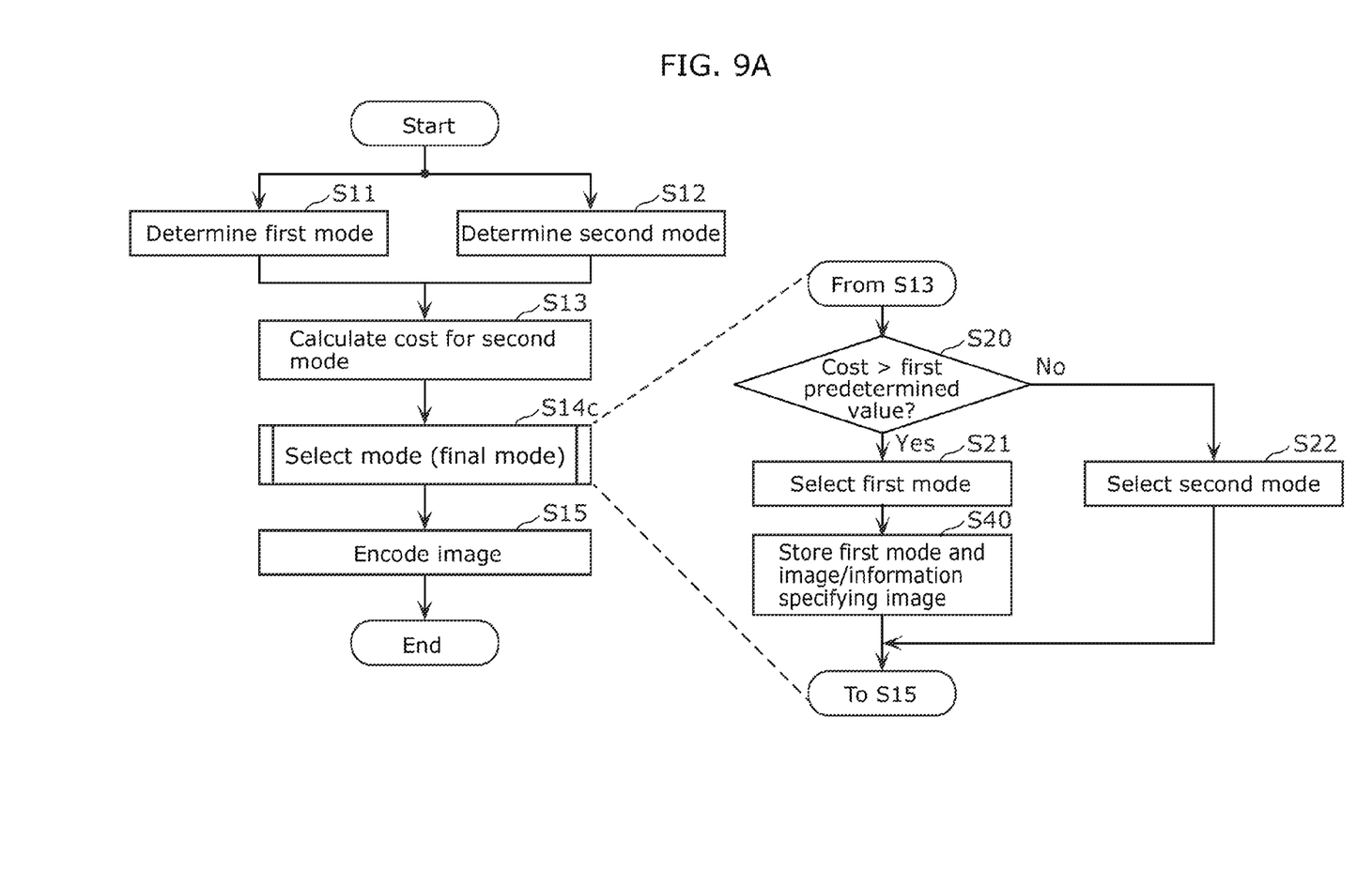
FIG. 9A is a flowchart illustrating operations in an encoding mode of the image encoding device according to Embodiment 2.

FIG. 9A is a flowchart illustrating operations in the encoding mode of image encoding device 10a according to Embodiment 2. This flowchart differs from the flowchart in FIG. 5 according to Embodiment 1 in that the mode selection (S14c) includes, after the selection of the first mode (S21), an additional step (storage step S40) in which storage 16 stores the first mode determined by first mode determination engine 11 and either the target image or the information specifying the target image in memory 16a.

As described above, in the encoding mode according to this variation, the image encoding method includes storage step S40 of storing the first mode and either the image or the information specifying the image in memory 16a when the second mode is not selected in mode selection step S14 (Yes in S20).

Accordingly, the first mode and either the image or the information specifying the image are stored in memory 16a when the second mode is not selected. Thus, for example, when a machine-learned mode determination engine is provided as second mode determination engine 12 that determines the second mode, proper output data (i.e., first mode) and input data (image or information specifying the image) when an inappropriate second mode is determined by second mode determination engine 12 are stored in memory 16a. This allows second mode determination engine 12 to be subjected to machine learning (i.e., supervised learning) using these pieces of data.

Figure 9B:
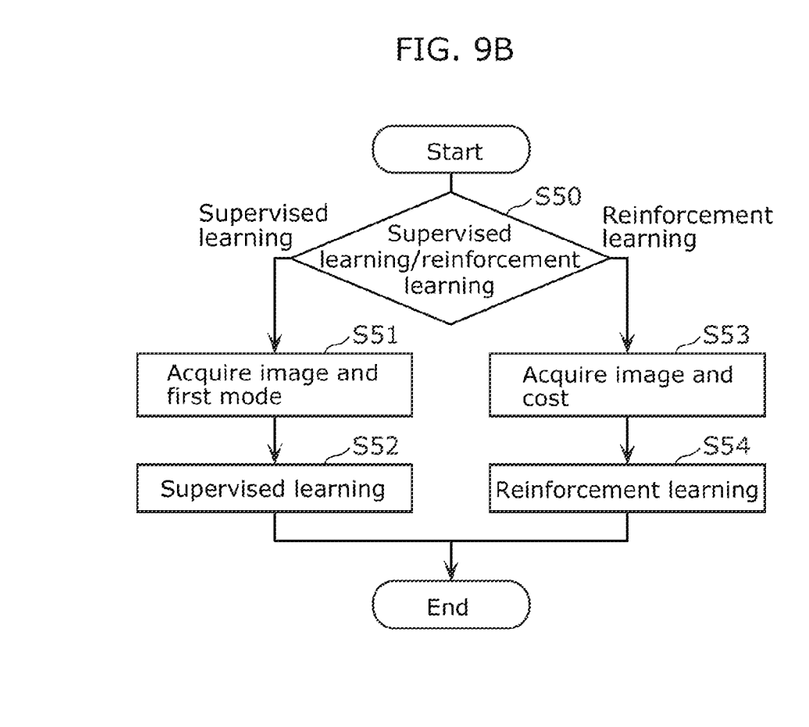
FIG. 9B is a flowchart illustrating operations in a learning mode of the image encoding device according to Embodiment 2.

FIG. 9B is a flowchart illustrating operations (i.e., image encoding method) in the learning mode of image encoding device 10a according to Embodiment 2. Here, a flowchart focusing on operations of learning controller 17 is illustrated.

First, learning controller 17 determines whether second mode determination engine 12 is subjected to supervised learning or reinforcement learning, depending on advance settings (S50).

As a result, if second mode determination engine 12 is determined to be subjected to supervised learning ("Supervised learning" in S50), learning controller 17 acquires the first image and the target image by reading out the first mode determined by first mode determination engine 11 and either the target image or information specifying the target image from memory 16a (S51). Note that, when the information specifying the target image is read out from memory 16a, learning controller 17 acquires the target image by referencing a database (e.g., database stored in memory 16a) that stores the target image and the information specifying the target image in association with each other. Then, learning controller 17 subjects the reconfigurable circuit implementing second mode determination engine 12 to supervised learning, using, as input data, the target image read out from memory 16a or the target image indicated by the information specifying the target image and read out from memory 16a and using also the first mode read out from memory 16a as training data (S52).

On the other hand, if second mode determination engine 12 is determined to be subjected to reinforcement learning ("Reinforcement learning" in S50), learning controller 17 acquires the cost calculated for the second mode determined by second mode determination engine 12 and the target image at that time from cost calculator 13 (S53). Then, learning controller 17 subjects the reconfigurable circuit that implements second mode determination engine 12 serving as an agent to reinforcement learning, using the target image as input data and using a value corresponding to the cost for the second mode determined by second mode determination engine 12 for the target image (e.g., a reciprocal of the cost) as a reward (S54).

As described above, in the learning mode according to this variation, the image encoding method includes learning control steps S50 to S54 in which learning controller 17 subjects the reconfigurable circuit implementing second mode determination engine 12 to machine learning so as to reconfigure the reconfigurable circuit. This allows second mode determination engine 12, which determines the second mode, to be subjected to machine learning so that a more appropriate mode will be selected as the second mode.

As one kind of machine learning, learning controller 17 may use the first mode determined by first mode determination step S11 as training data when subjecting the reconfigurable circuit that implements second mode determination engine 12 to supervised learning. This allows second mode determination engine 12, which determines the second mode, to be subjected to supervised learning using the first mode as training data.

As another kind of machine learning, learning controller 17 may use a reward corresponding to the cost calculated in cost calculation step S13 when subjecting the reconfigurable circuit implementing second mode determination engine 12 to learning. By determining the reward depending on the cost calculated in cost calculation step S13, second mode determination engine 12, which determines the second mode, can be subjected to reinforcement learning.

While the image encoding device and the image encoding method according to the present invention have been described thus far with reference to embodiments and variations, the present invention is not intended to be limited to these embodiments and variations. The present invention also includes other variations obtained by applying various changes conceivable by a person skilled in the art to each embodiment and obtained by any combinations of constituent elements and functions described in each embodiment without departing from the scope of the present invention.

For example, the embodiments and variations described above have taken the examples of the case in which first mode determination engine 11 is implemented as a mode determination engine according to a conventional technique (i.e., processing performed in accordance with theoretical algorithm) and second mode determination engine 12 is implemented as a mode determination engine configured as a neural network, but specific examples of first mode determination engine 11 and second mode determination engine 12 are not limited thereto. First mode determination engine 11 may be implemented as any of reconfigurable circuits and non-reconfigurable circuits as long as it is possible to select the first mode suited to image encoding from among a plurality of selectable modes in accordance with an arbitrarily search algorithm. Second mode determination engine 12 may be a mode determination engine implemented as a reconfigurable circuit, and is not limited to a neural network. For example, second mode determination engine 12 may be a mode determination engine capable of learning the second processing procedure through arbitrarily machine learning, such as a support vector machine.

The image encoding devices according to embodiments and variations described above include two types of mode determination engines, but may include three or more types of mode determination engines. For example, a plurality of first mode determination engines that each determine the first mode through processing in accordance with a different theoretical algorithm may be included as first mode determination engines, and one of the first mode determination engines may be selected for execution, depending on the cost for the second mode calculated by cost calculator 13.

According to Variation 2 of Embodiment 1 described above, the mode selection (S14$b$) is conducted such that the determination using the cost for the second mode (S20) is performed after the determination using the probability (S30, S31), but the order of these steps may be reversed. That is, the determination using the cost for the second mode (S20) may be first performed, and then the determination using the probability (S30, S31) may be performed.

According to Variation 2 of Embodiment 1 described above, the determination of the first mode (first mode determination step S11) is performed after the first mode is determined to be selected (Yes in S30, Yes in S20), but this variation is not limited to this processing procedure. As in Embodiment 1, the determination of the first mode (first mode determination step S11) may be performed before the mode selection (S14$b$).

According to Embodiment 2 described above, the determination of the first mode (first mode determination step S11) is always performed before the calculation of the cost for the second mode (cost calculation step S13) and the comparison between the result of cost calculation and the first predetermined value (mode selection step S14$c$), but the embodiment is not limited to this procedure. As in Variations 1 and 2 of Embodiment 1, whether to perform the determination of the first mode may be determined depending on the result of comparison between the cost for the second mode and the first predetermined value or the result of comparison between the probability indicated by the probability information and the second predetermined value.

According to the embodiments and variations described above, in the comparison between the cost and the first predetermined value and in the comparison between the probability and each of the second and third predetermined values, mode selector 14 performs one of the two selective processes after these comparisons when the cost and the first predetermined value are the same and when the probability and each of the second and third predetermined values are the same. Instead of this, the other of the two selective processes may be performed after these comparison. That is, the languages "higher than the first predetermined value" and "lower than or equal to the first predetermined value" may be replaced respectively by "higher than or equal to the first predetermined value" and "lower than the first predetermined value". Similarly, the languages "lower than the second predetermined value" and "higher than or equal to the second predetermined value" may be replaced respectively by "lower than or equal to the second predetermined value" and "higher than the second predetermined value". The languages "higher than or equal to the third predetermined value" and "lower than the third predetermined value" may also be replaced respectively by "higher than the third predetermined value" and "lower than or equal to the third predetermined value". This may imply that there are no substantial differences between these expressions, depending on the values set to the first, second, and third predetermined values.

In the embodiments and variations described above, "Cost=Distortion+λ*Rate" is used as the cost function, but the cost function is not limited to this function. For example, other functions may be used as long as the cost will increase in both cases where encoding distortion increases and where the number of bits generated increases.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present invention is applicable to an image encoding device for selecting a mode suited to encoding and then encoding an image, such as a moving-image encoding device configured by one or more semiconductor integrated circuits including machine-learned mode determination engines.

The invention claimed is:

1. An image encoding method for encoding an image, comprising:
   using the image as input, determining a first mode suited to encode the image in accordance with a first processing procedure;
   using the image as input, determining a second mode suited to encode the image in accordance with a second processing procedure, the second processing procedure being implemented by a circuit that is reconfigurable;
   calculating a cost of using the second mode to encode the image,
   selecting one of the first mode and the second mode as a final mode, the final mode being utilized to encode the image, the first mode is selected when the cost is higher than a fixed first predetermined value, and the second mode is selected when the cost is lower than or equal to the fixed first predetermined value;
   encoding the image using the final mode to generate an encoded bit stream to be decoded in a decoder device,
   wherein the encoding of the image includes at least one of orthogonal transformation, quantization, or entropy coding, the encoding of the image being processing to output a bit stream.

2. The image encoding method according to claim 1,
wherein the first processing procedure is a processing procedure for calculating a cost of using each of a plurality of predetermined modes to encode the image, and determining a mode having the cost calculated as a minimum as the first mode, and the second processing procedure is a processing procedure for determining the second mode from among the plurality of predetermined modes without using cost calculation.

3. The image encoding method according to claim 1, wherein the circuit is reconfigured by machine learning.

4. The image encoding method according to claim 1, wherein the determining a first mode is executed only when the cost is higher than the fixed first predetermined value, out of cases in which the cost is higher than the fixed first predetermined value and in which the cost is lower than or equal to the fixed first predetermined value.

5. The image encoding method according to claim 1,
wherein the determining a second mode further includes generating probability information indicating a probability of suitability of the second mode to encode the image, and the selecting further includes selecting the first mode when the probability indicated by the probability information is lower than a second predetermined value, and selecting the second mode when the probability indicated by the probability information is higher than or equal to a third predetermined value.

6. The image encoding method according to claim 5, wherein the determining a first mode is executed only when the probability indicated by the probability information is lower than the second predetermined value, out of cases in which the probability indicated by the probability information is lower than the second predetermined value and in which the probability indicated by the probability information is higher than or equal to the third predetermined value.

7. The image encoding method according to claim 1, further comprising:
storing the first mode and either the image or information specifying the image in a memory when the second mode is not selected in the selecting.

8. The image encoding method according to claim 1, further comprising:
subjecting the circuit to machine learning to reconfigure the circuit.

9. The image encoding method according to claim 8, wherein in the subjecting, the first mode determined in the determining a first mode is used as training data to subject the circuit to supervised learning.

10. The image encoding method according to claim 8, wherein in the subjecting, a reward corresponding to the cost calculated in the calculating is used to subject the circuit to reinforcement learning.

11. The image encoding method according to claim 1, wherein the fixed first predetermined value is a value which does not depend on a target image for encoding.

12. An image encoding device for encoding an image, comprising:
a first mode determination engine that, using the image as input, determines a first mode suited to encode the image in accordance with a first processing procedure;

a second mode determination engine that, using the image as input, determines a second mode suited to encode the image in accordance with a second processing procedure, the second processing procedure is implemented by a circuit that is reconfigurable;

a cost calculator that calculates a cost of using the second mode to encode the image;

a mode selector that selects one of the first mode and the second mode as a final mode, the final mode being utilized to encode the image, the mode selector selects the first mode when the cost is higher than a fixed first predetermined value and selects the second mode when the cost is lower than or equal to the fixed first predetermined value;

an encoder that encodes the image using the final mode to generate an encoded bit stream to be decoded in a decoder device;

wherein the encoding of the image includes at least one of orthogonal transformation, quantization, or entropy coding, the encoding of the image being processing to output a bit stream.

13. The image encoding device according to claim 12, further comprising:
a learning controller that subjects the circuit to machine learning to reconfigure the circuit.

14. The image encoding device according to claim 13, wherein the learning controller uses the first mode determined by the first mode determination engine as training data to subject the circuit to supervised learning.

15. The image encoding device according to claim 13, wherein the learning controller uses a reward corresponding to the cost calculated by the cost calculator to subject the circuit to reinforcement learning.

16. The image encoding device according to claim 12,
wherein the first mode determination engine calculates a cost of using each of a plurality of predetermined modes to encode the image, and determines a mode having the cost calculated as a minimum as the first mode, and the second mode determination engine determines the second mode from among the plurality of predetermined modes without using cost calculation.

17. The image encoding device according to claim 12, wherein the fixed first predetermined value is a value which does not depend on a target image for encoding.

* * * * *